United States Patent
Roth et al.

[11] Patent Number: 6,073,914
[45] Date of Patent: Jun. 13, 2000

[54] RELEASE APPARATUS FOR A HOLDDOWN DEVICE

[75] Inventors: Martin Roth, Taufkirchen; Robert Apfelbeck, Plattling, both of Germany

[73] Assignee: Daimler-Benz Aerospace AG, Germany

[21] Appl. No.: 08/980,913

[22] Filed: Dec. 1, 1997

[30] Foreign Application Priority Data

Nov. 30, 1996 [DE] Germany ............................ 196 49 739

[51] Int. Cl.[7] .................................................. E21B 19/00
[52] U.S. Cl. ............................................. 254/29 A; 29/452
[58] Field of Search ............................ 254/29 A; 29/452; 269/181, 182, 173; 411/432, 433

[56] References Cited

U.S. PATENT DOCUMENTS

| | | | |
|---|---|---|---|
| 1,021,110 | 3/1912 | Niewohner | ............................... 411/433 |
| 3,597,919 | 8/1971 | Lilly . | |
| 5,282,709 | 2/1994 | Chaput et al. . | |

FOREIGN PATENT DOCUMENTS

| | | |
|---|---|---|
| 0 716 982 A1 | of 1994 | European Pat. Off. . |
| 7 187094 | of 1995 | Japan . |

*Primary Examiner*—Timothy V. Eley
*Assistant Examiner*—Benjamin M. Halpern
*Attorney, Agent, or Firm*—Evenson, McKeown, Edwards & Lenahan, P.L.L.C.

[57] ABSTRACT

A release element for a holddown device, on a solar generator, for example, with a retaining bolt which is under pretension in the direction of its lengthwise axis, releases the retaining bolt from its pretensioned position. Pretensioning force is exerted on the retaining bolt through thread located at the end of retaining bolt into a corresponding internal thread in the release device. Internal thread is located half in a housing of release device and half in an opener. Opener is inserted pivotably in a cutout of housing and held in place by a wire coil wound around housing and opener. To release retaining bolt, the wire coil is released by fuse elements and expands to a larger diameter, releasing the retaining bolt.

9 Claims, 3 Drawing Sheets

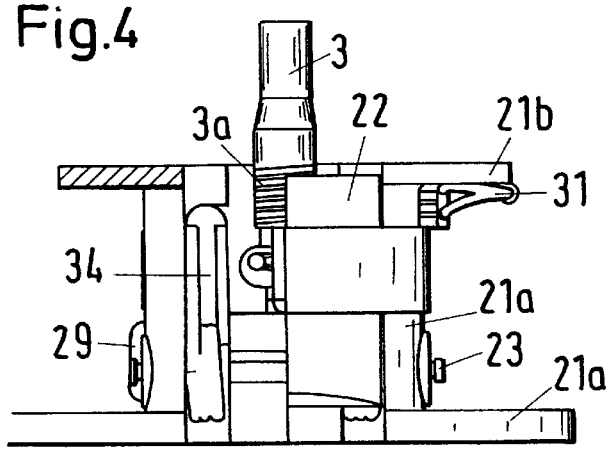
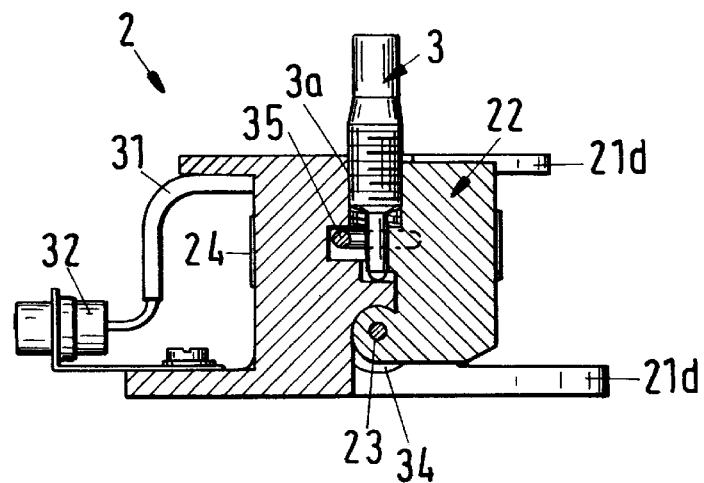
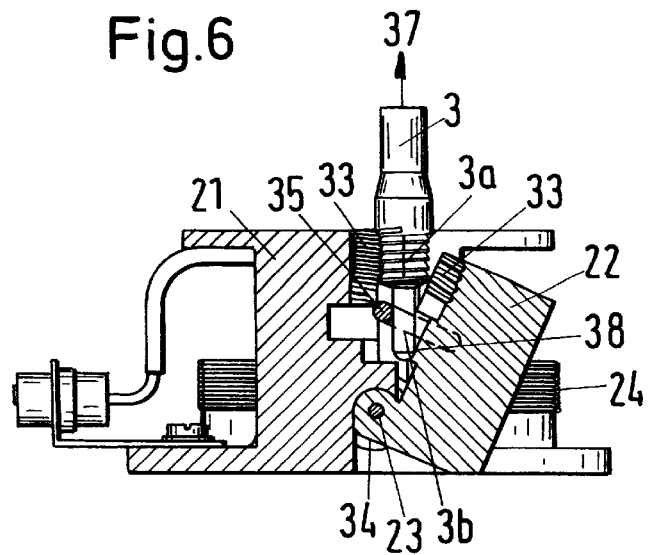

RELEASE APPARATUS FOR A HOLDDOWN DEVICE

BACKGROUND AND SUMMARY OF THE INVENTION

This application claims the priority of German patent document 196 49 739.6, the disclosure of which is expressly incorporated by reference herein.

The invention relates to a release device for a retaining bolt that can be pretensioned in the direction of its lengthwise axis. The device releases the retaining bolt from a pretensioned deployment position.

German patent document DE-AS 28 53 070 discloses a release device of this kind, in which the retaining bolt is held in its pretensioned position by the nose of a locking pin. After being released, the locking pin is pushed back by a blocking element due to the pretensioning of the retaining bolt. In an embodiment currently in use, the locking pin is separated pyrotechnically. In this known device, only a limited holddown power is possible, and pyrotechnic separation of the locking pin poses problems in spacecraft due to shock and the creation of particles.

The object of the present invention is to permit higher holddown forces in a release device of the type mentioned above.

Another object of the invention is to accommodate the parts of the device in a small space. Still another object of the invention is to eliminate the need for pyrotechnics.

These and other objects and advantages are achieved by the release device according to the invention, in which the end of a retaining bolt which is used to hold down, for example, the solar panels of a solar generator, is screwed into an opener which consists of two halves that are separable along a longitudinal axis of threads which hold the screwed in end. The two halves of the opener are held together by a coil of wire which is anchored by fuse elements at both ends thereof. To release the retaining bolt, the wire coil is released by the fuse elements, permitting the halves of the opener to separate.

The device according to the invention has a number of advantages. The holddown power can exceed 13,000 N. Release by opening the wire coil using fuse wires takes place at both ends of the wire coil, and is therefore redundant. No pyrotechnic triggering energy is necessary, no parts are destroyed, and thus no particles are released that contaminate the chamber. The device is given a compact design, and one practical application has a diameter of only 56 mm and is 27 mm high, weighing 0.084 kg. The device can be used universally in a temperature range of ±150° C. Because pyrotechnics are eliminated, no specially trained personnel are required.

Other objects, advantages and novel features of the present invention will become apparent from the following detailed description of the invention when considered in conjunction with the accompanying drawings.

BRIEF DESCRIPTION OF THE DRAWINGS

FIG. 4 is a view of the release device in the direction of the arrow IV in FIG. 2 in a half section;

FIG. 5 shows a section through the release device taken along line V—V in FIG. 2, with an opener wound with a wire coil; and FIG. 6 is a section as in FIG. 5, with an open wire coil and the opener swung away.

DETAILED DESCRIPTION OF THE DRAWINGS

Figure 1:
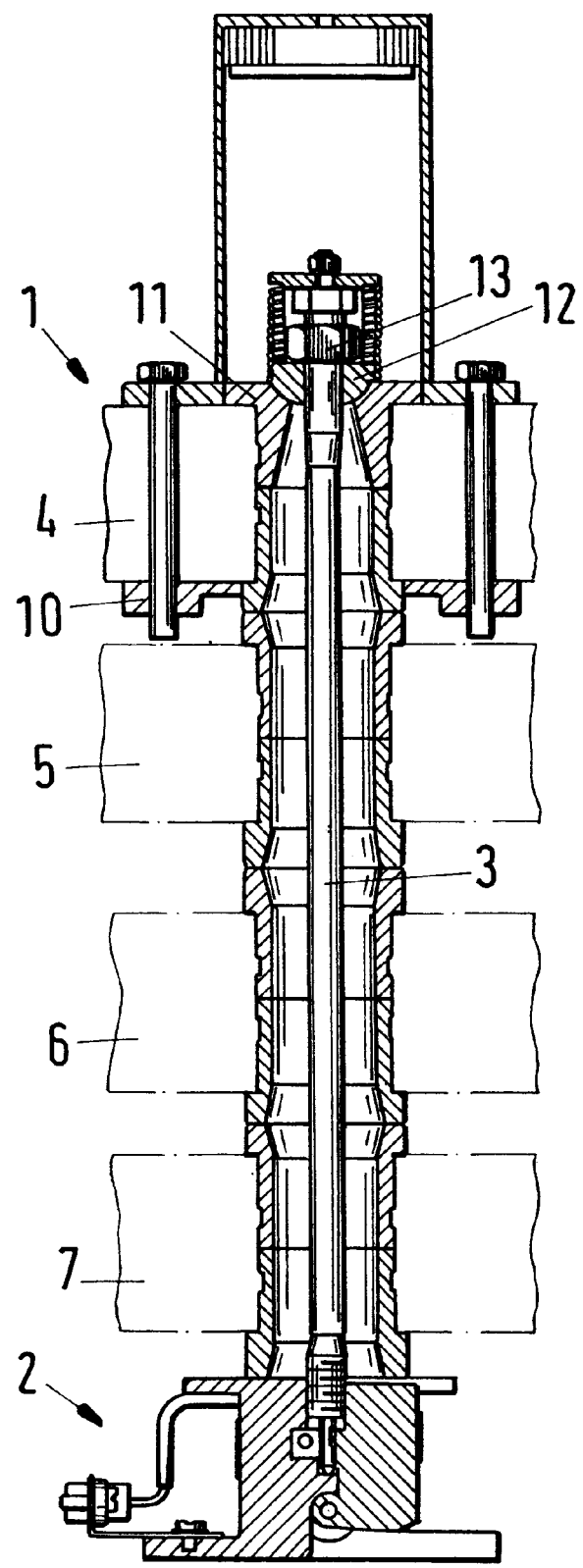
FIG. 1 shows an overall view of a holddown with a release device according to the invention.
Figure 2:
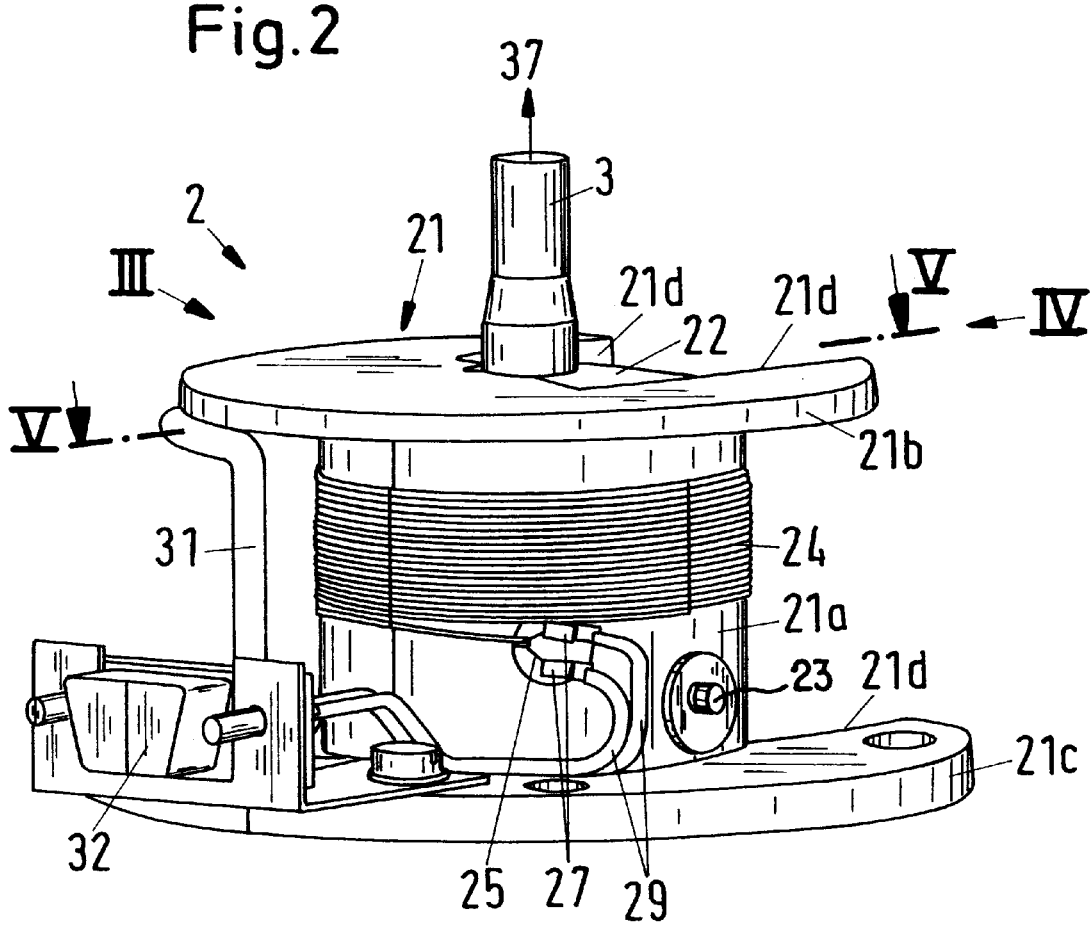
FIG. 2 shows the release device in a perspective view.
Figure 3:
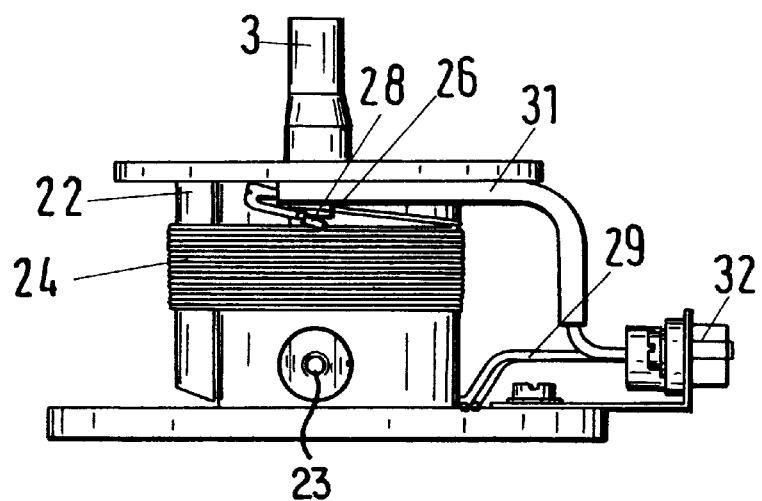
FIG. 3 shows a view of the release device in the direction of the arrow III in FIG. 2.

In the overall view of a holddown 1 for a solar generator according to FIG. 1 with a release device 2, four panels 4, 5, 6, and 7 are held together by a retaining bolt 3, which is mounted in a skirt 12 in uppermost panel 4. The lower end of the retaining bolt 3 is screwed into release device 2.

Release device 2 is shown in greater detail in various views in FIGS. 2 to 6. A housing 21 consists of a cylindrical part 21a and two flanges 21b and 21c. Housing 21 has an approximately rectangular cutout 21d that expands vertically, in which an opener 22 is pivotably mounted. Pin 23 holds opener 22 after opening. A coil 24 is wound around cylindrical part 21a and opener 22, said coil being provided at its ends with fuse wires 25 and 26 connected with contact blocks 27 and 28 of electrical lines 29 and 31. Lines 29 and 31 lead to a socket arrangement 32. Retaining bolt 3 is screwed into release device 2 by a thread 3a in such manner that internal thread 33 is disposed half in housing 21 and half in opener 22, as is especially clear from FIGS. 5 and 6.

When a voltage is applied to fuse wires 25 and 26 through lines 29 and 31, the fuse wires melt and wire coil 24 spreads (see FIG. 6). This releases opener 22, which pivots to the side under the influence of two leg springs 34 located laterally behind opener 22 and the tensioning force is conducted into the halves of the thread (see FIGS. 4 and 6). A U-loop 35 inserted into opener 22 brings retaining bolt 3, provided with a pin, into the open position. U-loop 35 and a guide path 38 in opener 22 guide retaining bolt 3 as it is pulled back for as long as it and thread 3a are in the vicinity of nut halves 33.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Release apparatus for a holddown device having a retaining bolt which is pretensioned in a direction of its lengthwise axis, said apparatus releasing the retaining bolt from its pretensioned position, said apparatus comprising:

a release device having a housing with a cutout therein, and an internal thread into which a threaded end of said retaining bolt is screwed, whereby pretensioning force in said retaining bolt is conducted through said threaded end of said retaining bolt;

an opener mounted pivotably in said cutout of said housing; and a wire coil wound around the housing and the opener and holding said opener in position in said cutout;

wherein said internal thread is located half in a housing of the release device and half in an opener;

said wire coil is releasable for causing the opener to pivot away and release the retaining bolt; and ends of said wire coil are held by fuse wires, said wires melting when electrical voltage is applied, causing the wire coil to spread and release the opener.

2. Release device according to claim 1, wherein the retaining bolt is connected to retain a plurality of solar panels, including an uppermost panel having a skirt into which the retaining bolt is inserted, and a nut that presses on the skirt and pretensions the retaining bolt.

3. Release device according to claim 1, wherein pivoting away of the opener is reinforced by two leg springs inserted laterally with respect to the internal thread in the housing.

4. Release device according to claim 1, wherein:
- the retaining bolt emerges at a bottom area in a pin around which a U-loop inserted in the opener is located; and
- when the opener pivots away, the U-loop pulls the retaining bolt out of the internal thread, and guides it as it is pulled out of the release device for as long as it is in the vicinity of the internal thread.

5. A release apparatus for a holddown device having a retaining bolt with an end portion thereof which is releasably retained in said holddown device, said release apparatus comprising:
- a holding member having a receptacle therein for receiving and retaining said end portion of said retaining bolt, said holding member comprising first and second elements which are mutually separable along a substantially longitudinal axis of said receptacle for releasing said retaining bolt; and
- a wire coil wound around said first and second elements for holding them together, said wire coil being releasable from said first and second elements, whereby said first and second elements are freed to separate along said longitudinal axis of said receptacle;
- wherein ends of the wire coil are held by fuse wires, said wires melting when electrical voltage is applied, causing the wire coil to spread and release the opener.

6. A release apparatus for a holddown device according to claim 5, wherein said receptacle has internal threads for engaging with and holding threads on said end portion of said retaining bolt.

7. A release apparatus for a holddown device according to claim 5, further comprising means for biasing said first and second elements to separate upon release of said coil.

8. A release apparatus for a holddown device having a retaining bolt with an end portion thereof which is releasably retained in said holddown device, said release apparatus comprising:
- a holding member having a receptacle therein for receiving and retaining said end portion of said retaining bolt, said holding member comprising first and second elements which are mutually separable along a substantially longitudinal axis of said receptacle for releasing said retaining bolt; and
- a wire coil wound around said first and second elements for holding them together, said wire coil being releasable from said first and second elements, whereby said first and second elements are freed to separate along said longitudinal axis of said receptacle; and
- wherein said wire coil comprises at least one fuse portion which can be melted by passing an electric current therein.

9. A release apparatus for a holddown device having a retaining bolt with an end portion thereof which is releasably retained in said holddown device, said release apparatus comprising:
- a holding member having a receptacle therein for receiving and retaining said end portion of said retaining bolt, said holding member comprising first and second elements which are mutually separable along a substantially longitudinal axis of said receptacle for releasing said retaining bolt;
- a wire coil wound around said first and second elements for holding them together, said wire coil being releasable from said first and second elements, whereby said first and second elements are freed to separate along said longitudinal axis of said receptacle; and
- means for biasing said first and second elements to separate upon release of said coil;
- wherein said wire coil comprises at least one fuse portion which can be melted by passing an electric current therein.

* * * * *